US011451922B1

(12) United States Patent
Moses et al.

(10) Patent No.: US 11,451,922 B1
(45) Date of Patent: Sep. 20, 2022

(54) HEAD-MOUNTED SPEAKER ARRAY

(71) Applicant: Amazon Technologies, Inc., Seattle, WA (US)

(72) Inventors: Robert Wadia Moses, Vashon, WA (US); Jan Aage Abildgaard Pedersen, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/902,102

(22) Filed: Jun. 15, 2020

(51) Int. Cl.
*H04S 7/00* (2006.01)
*H04R 5/033* (2006.01)

(52) U.S. Cl.
CPC ........... *H04S 7/304* (2013.01); *H04R 5/0335* (2013.01)

(58) Field of Classification Search
None
See application file for complete search history.

(56) References Cited

U.S. PATENT DOCUMENTS

| 2020/0053456 | A1* | 2/2020 | Williams | H04R 1/1008 |
| 2021/0055367 | A1* | 2/2021 | Poore | G01S 3/803 |
| 2021/0258715 | A1* | 8/2021 | Audfray | H04S 7/306 |

OTHER PUBLICATIONS

Headphonesty, The Most Interesting Headphones in the World, [site accessed May 22, 2020] URL: https://www.headphonesty.com/2018/04/the-most-interesting-cool-headphones-in-the-world/, May 20, 2018, 36 pages.

* cited by examiner

*Primary Examiner* — Kenny H Truong
(74) *Attorney, Agent, or Firm* — Athorus, PLLC (57) ABSTRACT

The described implementations of a head-mounted speaker array apparatus ("HMSAA") include speaker arrays having one or more speakers that, when the HMSAA is worn on the head of a listener, are positioned forward of the pinna of each ear of the listener. For example, the HMSAA may include a first speaker array that is coupled to a frame that, when worn by a listener, positions the first speaker array forward of a first pinna of a first ear of the listener. A second speaker array may also be coupled to the frame at a position that, when the frame is worn by the listener, the second speaker array is positioned forward of a second pinna of the second ear of the listener.

18 Claims, 10 Drawing Sheets

HEAD-MOUNTED SPEAKER ARRAY

BACKGROUND

Audio is often experienced through in-room speakers, in-ear headphones (also known as earbuds) or over-the-ear headphones. With the advances in audio processing, sounds can be output from these various output devices such that they are perceived by the listener to be originating from different locations or point sources within a room—e.g., to the left, right, behind, above, or below the listener. However, even with these advancements, current systems are unable to generate point source sounds that are perceived to originate in front of the listener.

DETAILED DESCRIPTION

As is set forth in greater detail below, implementations of the present disclosure are directed to an apparatus, systems, and methods to improve the perceived point source of sounds output to a listener.

Rather than using in-room speakers, in-ear headphones (also known as earbuds), or over-the-ear headphones, the disclosed implementations include a head-mounted speaker array apparatus ("HMSAA") that includes speakers that are positioned forward of the left pinna of the left ear and right pinna of the right ear of a listener wearing the HMSAA. In some implementations, the HMSAA may include a first speaker array that is coupled to a frame that, when worn by a listener, positions the first speaker array forward of a first pinna of a first ear of the listener. A second speaker array may also be coupled to the frame at a position that, when the frame is worn by the listener, the second speaker array is positioned forward of a second pinna of a second ear of the listener.

As discussed further below, the frame of the HMSAA may take a variety of forms including, but not limited to, a frame similar to a pair of glasses that includes temples, hinges, a bridge, etc., allowing the listener to wear the HMSAA on their face similar to wearing glasses. In other implementations, the frame may be a pair of glasses and the first speaker array and the second speaker array may be permanently or detachably coupled to the frame. In still other examples, the frame may have a curved shape with a first end and a second end that is to be worn on the head of the listener such that the first end and the second end are positioned forward of a first pinna of a first ear and a second pinna of a second ear of the listener, respectively. In such a configuration, the first speaker array may be coupled to or included in the first end of the frame and the second speaker array may be coupled to or included in the second end of the frame. In still another example, a single speaker, single speaker array, pairs of speakers, or pairs of speaker arrays may be included on the frame and the frame may further include wave guides with outlets that are positioned forward of the first pinna of the first ear and the second pinna of the second ear of the listener so that sounds output by the speaker(s)/speaker array(s) travel through the waveguides, and are projected through the outlets toward the pinna of the left ear and the pinna of the right ear of the listener. In other examples, the HMSAA may include or be attached to other objects that may be worn or placed on a user such that, when worn or placed, the first speaker array and the second speaker array are positioned forward of the first pinna of the first ear and the second pinna of the second ear of the listener, respectively. For example, the HMSAA may include or be coupled to a hat, visor, helmet, headband, etc., that when worn by the listener, position the first speaker array forward of the first pinna of the first ear of the listener and position the second speaker array forward of the second pinna of the second ear of the listener.

By positioning the speaker arrays/outputs forward of the pinna of the left ear of the listener and forward of the pinna of the right ear of the listener, the sounds output by the disclosed implementations are received by the pinna of each ear of the listener, which produce reflections or interference that the listener's brain uses to determine a point source (also referred to as sound localization) for the sound. In addition, in some implementations, positioning of the speaker arrays of the HMSAA forward of the face of the listener also provides additional interference/reflections off the face and/or torso of the listener that provide further information to the brain of the listener for point source determination.

In comparison to existing audio solutions, the disclosed implementations provide a balance or best of both worlds between in-room speakers and over-the-ear/in-ear headphones. Specifically, the speaker arrays of the HMSAA, when worn by the listener, are positioned forward of each pinna of the ears of the listener so that sounds output by the first speaker array are primarily received by and reflected off of the pinna of the first ear and sounds output from the second speaker array are primarily received by and reflected off of the second pinna of the second ear. By controlling the first output of the first sound by the first speaker array and the second output of the second sound by the second speaker array, the reflections of the sounds produced by the pinna of each ear are used by the brain of the listener to determine a perceived point source corresponding to the sound, even if that perceived point source is in-front of the listener.

In comparison, in-room speakers, while providing sounds that are received and reflected off each pinna, fail to provide good point source information because the sounds produced by the different speakers are combined and received at approximately the same time by each ear—i.e., there is essentially no separation of the sounds and therefore no ability for the brain of the listener to determine a perceived point source. While in-room systems that include front, center, and rear speakers improve the ability to provide a perceived source of a sound by actually outputting the sound from different locations within the room, such configurations are not personal to the listener, cannot be worn by the listener or carried with the listener—i.e., in-room speakers are just that; in room. Over-the-ear speakers or in-ear speakers provide good separation of sound and are portable, but do not provide sounds that are received and reflected off the pinna of the ears of the listener such that the brain can determine a perceived point source of the sound. As a result, sounds output from over-the-ear speakers and in-ear speakers are typically perceived by the listener as originating from within the head of the listener, rather than at a point around the listener. This is particularly true for sounds that are intended to originate in front of the listener.

The disclosed implementations provide a technical improvement over existing audio output devices. For example, as discussed herein, the disclosed implementations improve a perceived point source of output sounds. This improvement may be further enhanced by combining the output sounds with visual information, such as virtual reality, video conferencing, etc. For example, the disclosed implementations, may be utilized to provide sounds that are perceived to originate from any position around a listener that is experiencing a virtual reality environment (e.g., above, below, left, right, or directly in front of the listener). As another example, when used with a video conferencing system, the perceived point source of the sound output by the disclosed implementations may be calibrated with the video of a person that is producing the output sound such that the sound is perceived to be originating from the mouth of the person presented in the video of the video conference system, rather than originating from the speakers of the video conference system. Such technical improvements provide a much more realistic experience for the listener.

Figure 1:
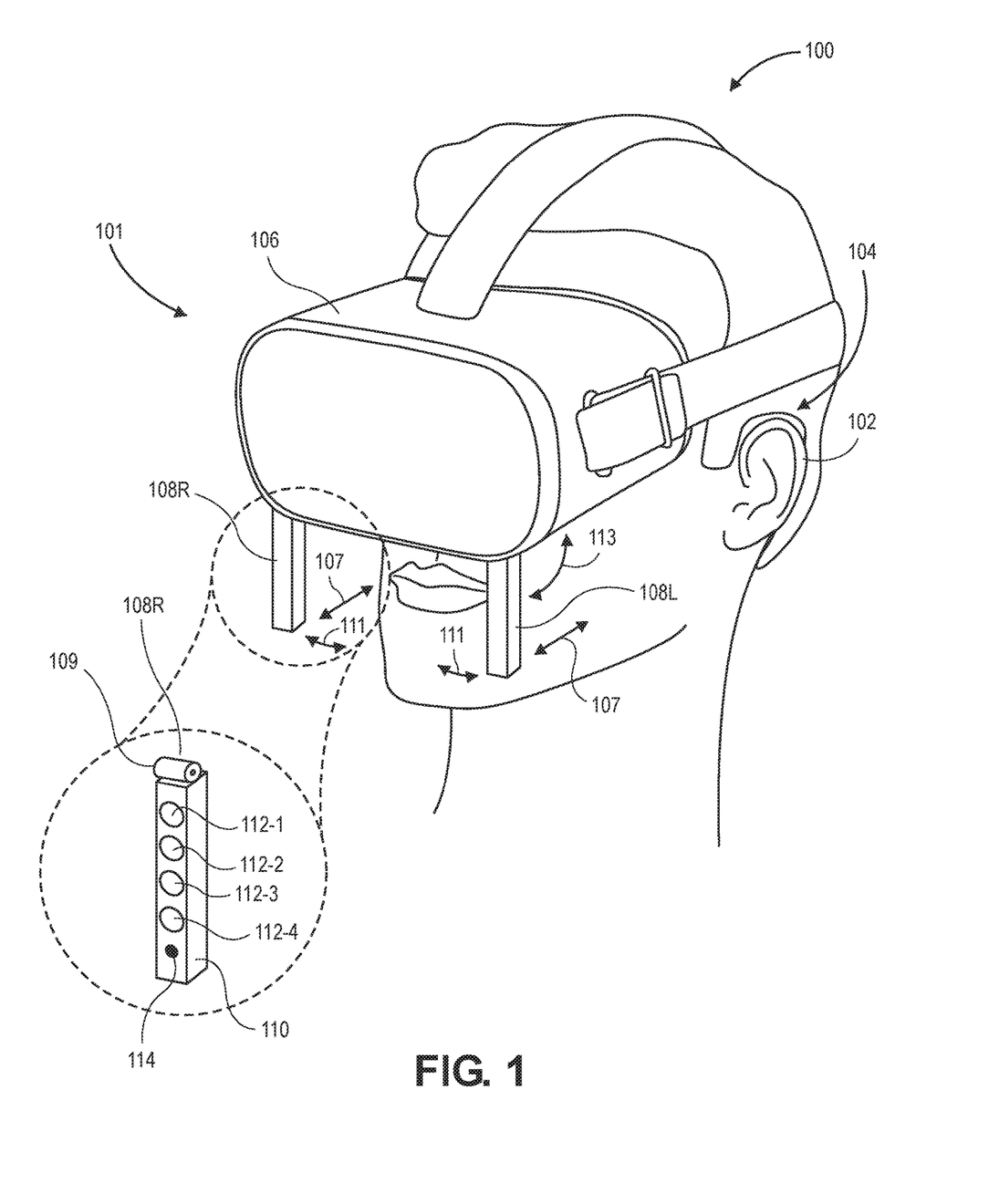
FIG. 1 is a diagram of a head-mounted speaker array apparatus coupled to virtual reality goggles, in accordance with implementations of the present disclosure.

FIG. 1 is a schematic diagram of a HMSAA 101 coupled to or including virtual reality goggles 106, in accordance with implementations of the present disclosure.

In the illustrated example, the HMSAA 101 and virtual reality goggles 106 are worn on the head of a listener 100. In this example, a first speaker array 108L is coupled to a first lower side of the VR goggles 106 such that the first speaker array 108L is positioned forward of a first pinna 102 of a first ear 104 of the listener 100, in this example a left ear of the listener, so that sounds output by the first speaker array 108L are primarily received by and reflected off of the first pinna 102 of the first ear 104. In addition, a second speaker array 108R is coupled to a second lower side of the VR goggles 106 such that the second speaker array 108R is positioned forward of a second pinna of a second ear of the listener 100, in this example a right ear of the listener, so that sounds output by the second speaker array 108R are primarily received by and reflected off of the second pinna of the second ear of the listener 100.

In some implementations, one or both of the first speaker array 108L and the second speaker array 108R may be adjustable with respect to the VR goggles 106. For example, one or both of the first speaker array 108L or the second speaker array 108R may be adjusted forward or backward, thereby moving the speaker array farther or closer to the respective pinna of the ear of the listener 100. For example, the first speaker array 108L may be moved backward toward the first pinna 102 of the first ear 104 of the listener or forward away from the first pinna 102 of the first ear 104 of the listener, as illustrated by arrows 107. Likewise, in some implementations, one or both of the speaker arrays 108L/108R may be moved laterally, closer or farther away from each other, as illustrated by arrows 111.

In some implementations, one or both of the first speaker array 108L or the second speaker array 108R may include a pivot 109 so that the speaker array 108L/108R may be pivoted between an open position, as illustrated, or a closed position. In the open position, as illustrated in FIG. 1, the speaker array 108L/108R is rotated downward and extends down from the frame or, in this example, the VR goggles 106 so that sounds output by the speaker array 108L/108R are primarily received and reflected by the respective pinna of each ear of the listener 100. In the closed position, the speaker array 108L/108R may be rotated upward, as illustrated by arrow 113 so that, when the speaker arrays 108L/108R are not in use, they are out of the way and the VR goggles may be transported/stored with reduced risk of breaking or dislodging the speaker arrays 108L/108R.

Referring now to the expanded view of the second speaker array 108R, as illustrated, each speaker array may include a housing 110 that houses one or more speakers, such as speakers 112-1, 112-2, 112-3, 112-4, and optionally a microphone 114 and/or a stereo camera or other depth sensor. Any of a variety of speakers may be included in each speaker array and the speakers of a speaker array, provided there are more than one speaker in the speaker array, may all be the same or different. For example, the speakers may include mechanical speakers, microelectromechanical systems ("MEMS") speakers, electromechanical speakers, etc.

As discussed further below, the speakers of each speaker array of the HMSAA 101 may be calibrated to balance the sounds output by the speakers based on, for example, the positioning of the speakers on the speaker arrays 108L/108R on the HMSAA 101, and/or with respect to the pinna of the ears, the face, the torso, etc., of the listener.

In some implementations, through use of a speaker array that includes a plurality of small speakers, such as MEMS speakers, the speaker array can be oriented and placed almost at zero degrees such that the output of the speakers are directed from a forward position and toward the pinna of each ear of the listener when the HMSAA 101 is worn by the listener. In comparison, over the ear headphones and/or other systems result in the speakers oriented at between forty-five degrees and ninety degrees with respect to the pinna of each ear of the listener. This offset in direction of the speaker arrays degrades the ability to produce sounds with a perceived point source that is forward of the listener. In comparison, by orienting the speaker arrays at approximately zero degrees, in accordance with the disclosed implementations, the perceived point source can be produced at any direction, even directly forward of the listener.

Figure 2:
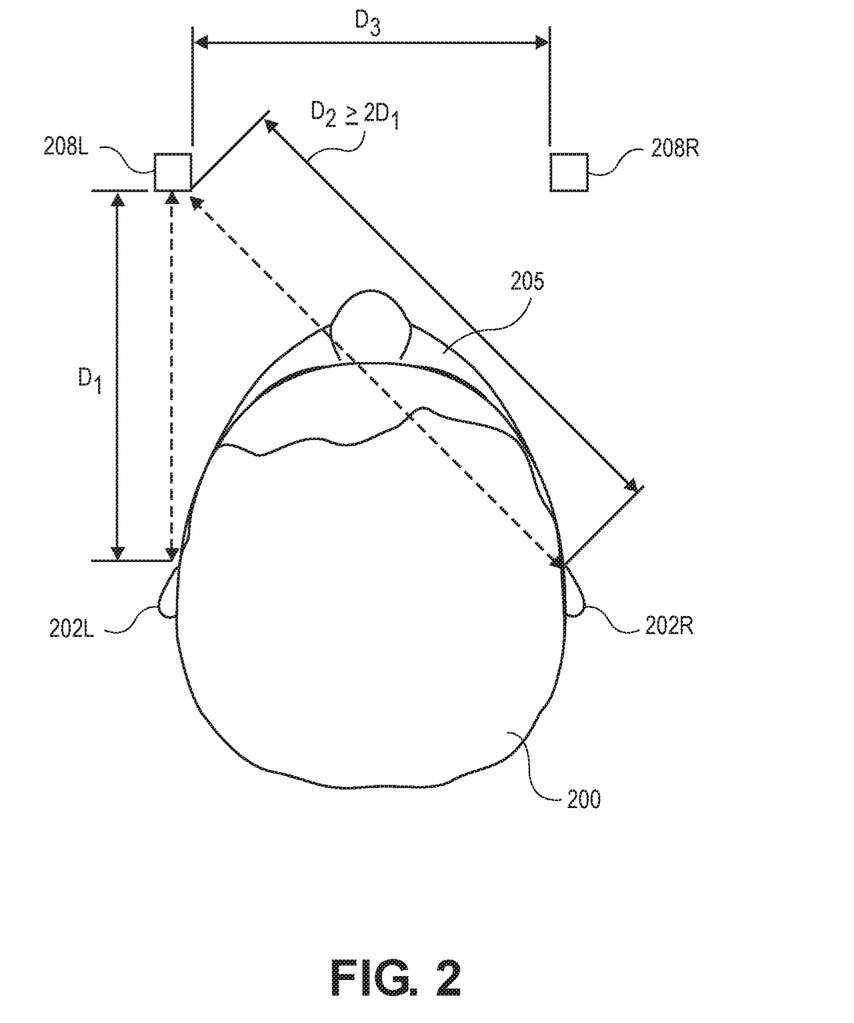
FIG. 2 is a top-down view of a listener and distance spacing of a speaker array of a head-mounted speaker array apparatus, in accordance with implementations of the present disclosure.

FIG. 2 is a top-down view of a listener and distance spacing of speaker arrays of a head-mounted speaker array apparatus, in accordance with implementations of the present disclosure.

In some implementations, the first speaker array 208L may be set at a distance of $D_1$ from a first ear 202L of the listener 200 such that a second distance $D_2$ is greater than or equal to twice the first distance $D_1$. The second speaker array 208R may be set similarly so that the distance between the second speaker array 208R and the first pinna 202L is greater than or equal to twice the distance between the second speaker array 208R and the second pinna 202R. In other implementations, different ratios between the positioning of the speaker arrays and the pinna of each ear of the listener may also be realized with the disclosed implementations. For example, on other implementations, the distance $D_2$ may be set to be equal to or greater than 1.5 times the first distance $D_1$.

By setting the distance of the speakers in a manner similar to that illustrated in FIG. 2, the sound output by each speaker is primarily received and reflected by the pinna of the closest ear, yet some of the sound is also received and reflected by the pinna of the opposing ear. For example, the sound output by the first speaker array 208L will be primarily received and reflected by the first pinna of the first ear 202L but some of the sound will also reach the pinna of the second ear 202R. Likewise, sound output by the second speaker array 208R will be primarily received and reflected by the second pinna of the second ear 202R but some of the sound will also reach the pinna of the first ear 202L. Setting the speakers at the illustrated distances provides a balance between isolation or shadowing of sound output by the respective speaker arrays but also some crosstalk between the speaker arrays, as perceived by each ear. Such a balance improves the realness of the perceived point source of the sound.

In addition, by positioning the speakers forward of the face 205 of the listener 200, as illustrated, the sound output by the speakers also reflects off the face 205 and torso of the listener, thereby providing additional information to the brain of the listener regarding the perceived point source of the audio.

In some implementations, the distance $D_3$ between the first speaker array 208L and the second speaker array 208R may be adjustable to further tune or control the amount of separation or shadowing of the sounds output by the speaker arrays and received by the pinna of each ear of the listener. For example, as the distance $D_3$ decreases, the amount of sound output by a speaker array that is received by the pinna on the opposing side of the head of the listener 200 increases because the shadowing provided by the head/face of the listener decreases. For example, as the distance $D_3$ decreases, the sound output by speaker array 208R that is received by the opposing pinna 202L increases because less of the sound is reflected or shadowed by the face 205 of the listener 200. In comparison, as the distance $D_3$ increases, the sound output by the speaker array 208R that is received by the opposing pinna 202L decreases as more of the sound is reflected or shadowed by the face 205 of the listener 200.

By adjusting the distance $D_3$ between the first speaker array 208L and the second speaker array 208R, the perceived separation of the sound as experienced by the listener 200 can be optimized to account for variation in shapes and sizes of the face/head of different listeners 200. In some implementations, the distance $D_3$ may be adjustable to increase or decrease the distance by three inches. In other implementations, the amount of adjustment to the distance $D_3$ may be greater or less than three inches.

Figure 3:
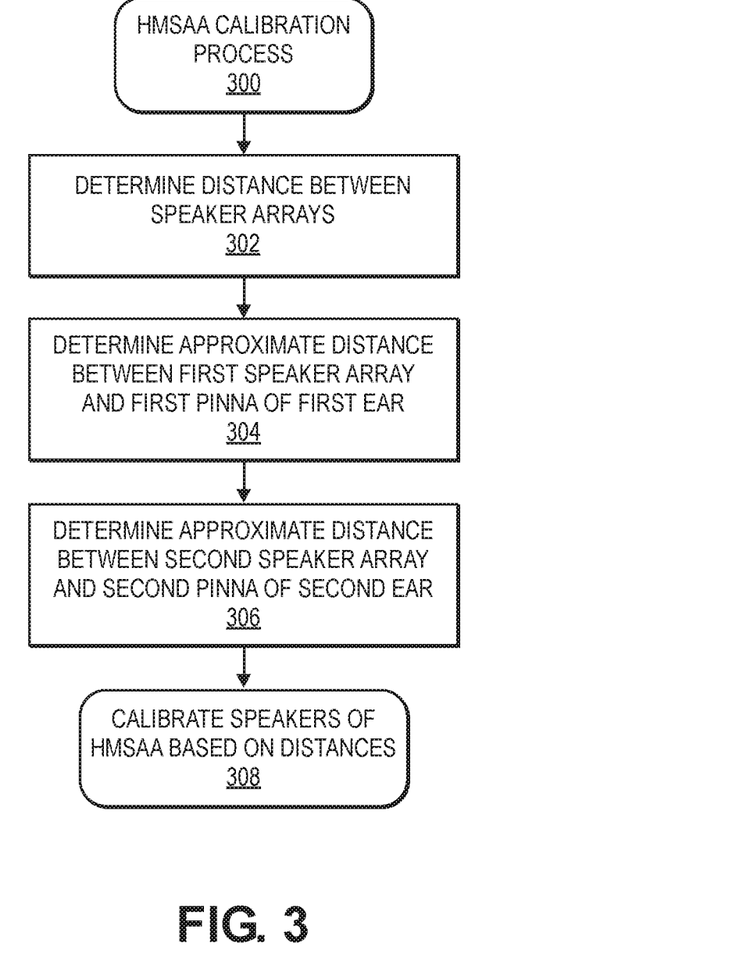
FIG. 3 is an example head-mounted speaker array apparatus calibration process, in accordance with implementations of the present disclosure.

FIG. 3 is an example head-mounted speaker array apparatus calibration process 300, in accordance with implementations of the present disclosure.

The example process 300 begins by determining a distance between the first speaker array and the second speaker array, as in 302. A variety of techniques may be used to determine the distance between the first speaker array and the second speaker array. For example, as discussed further below with respect to FIG. 4, the HMSAA may include an adjustment measurement sensor, such as a series of resistors that can determine if any distance adjustment to the first speaker array and/or the second speaker array is made from a neutral or starting position. For example, if the starting or neutral distance between the first speaker array and the second speaker array is seven inches and it is determined from the adjustment measurement sensor that the distance between the first speaker array and the second speaker array has been decreased by one inch, the distance between the first speaker array and the second speaker array is determined to be six inches.

In other examples, audible tones may be emitted from the first/second speaker array of the HMSAA. For example, a first tone may be output from the first speaker array and a second, different tone, may be output by the second speaker array. In other implementations, the speaker arrays may output tones at different times. As a tone or tones are output by a speaker array of the HMSAA, the microphone of the opposing speaker array receives the output tone(s) and, based on a time difference between an output time of the tone and a receipt time of the tone by the microphone of the opposing speaker array, a distance between the first speaker array and the second speaker array of the HMSAA may be determined. As is known, the speed of sound is 343 meters per second. Accordingly, the distance between the first speaker array and the second speaker array may be computed as the product between the speed of sound (343 m/s) and the time between the sound being emitted by the first speaker array and receipt of the sound by the second speaker array.

In still other examples, one or both of the speaker arrays may include a stereo camera array and/or other depth sensor(s) that may be used to determine a distance between the speaker arrays.

In addition to determining the distance between the first speaker array and the second speaker array, the example process 300 may also determine an approximate distance between the first speaker array and the first pinna of the first ear of the listener, as in 304, and the approximate distance between the second speaker array and the second pinna of the second ear of the listener, as in 306. Similar to determining the distance between the first speaker array and the second speaker array, a variety of techniques may be used to determine the approximate distance between the first speaker array and the first pinna of the first ear of the listener and the approximate distance between the second speaker array and the second pinna of the second ear of the listener.

For example, one or more sounds may be output from speaker(s) of one or both of the first speaker array or the second speaker array, and the sound(s) may be received by one or both of the microphones of the speaker arrays. By ignoring the sounds that are received direct from one speaker array to the other (i.e., not reflected), which is known based on the distance between the speaker arrays, reflected sounds may be determined and a distance to the object that reflected the sounds determined (e.g., the face of the speaker). For example, if the first speaker array outputs a first sound that is then received by the microphone of the first speaker array, the distance between the object that caused the reflection of the first sound, namely the face, torso, etc., of the listener, can be determined based on the round trip time between the output of the first sound and receipt of the first sound. By emitting multiple sounds from each of the first speaker array and the second speaker array and determining distances between objects that reflect those sounds back to the microphones of those speaker arrays, the approximate shape or profile of the face of the listener may be determined, along with the distance between the speaker arrays and the face of the listener.

As another example, as discussed further below with respect to FIG. 4, the listener may place a microphone at or near the first pinna of the first ear of the listener and/or the second pinna of the second ear of the listener and sounds may be output by the first speaker array and/or the second speaker array. As the sounds are output by the first speaker array and/or the second speaker array, the sounds are received by the microphone(s) positioned at or near the pinna of one or both ears and the time delay between transmission and receipt of the sounds used to determine the approximate distance between the first speaker array and the first pinna of the first ear of the listener and/or the approximate distance between the second speaker array and the second pinna of the second ear of the listener.

In other examples, one or both of the first speaker array or the second speaker array may include a stereo camera and/or other depth sensor(s) that may be used to determine the approximate distance between the first speaker array and the first pinna of the first ear of the listener and/or the approximate distance between the second speaker array and the second pinna of the second ear of the listener.

Finally, based on the determined distance between the speaker arrays, the approximate distance between the first speaker array and the first pinna of the first ear of the listener, and/or the approximate distance between the second speaker array and the second pinna of the second ear of the listener, the speakers of the first speaker array and the speakers of the second speaker array may be calibrated so that sounds output by the speakers of the first speaker array and the speakers of the second speaker array are balanced with respect to the listener wearing the HMSAA, and at a proper level, as in 308. For example, based on the determined distances, the amount of shadowing or crosstalk between the speaker arrays, as perceived by the listener may be estimated and used to adjust the frequency, tones, delay, etc., of the first speaker array and/or the second speaker array so that the perceived point source produced for sounds output by the HMSAA may be determined by the listener in accordance with the disclosed implementations.

Figure 4:
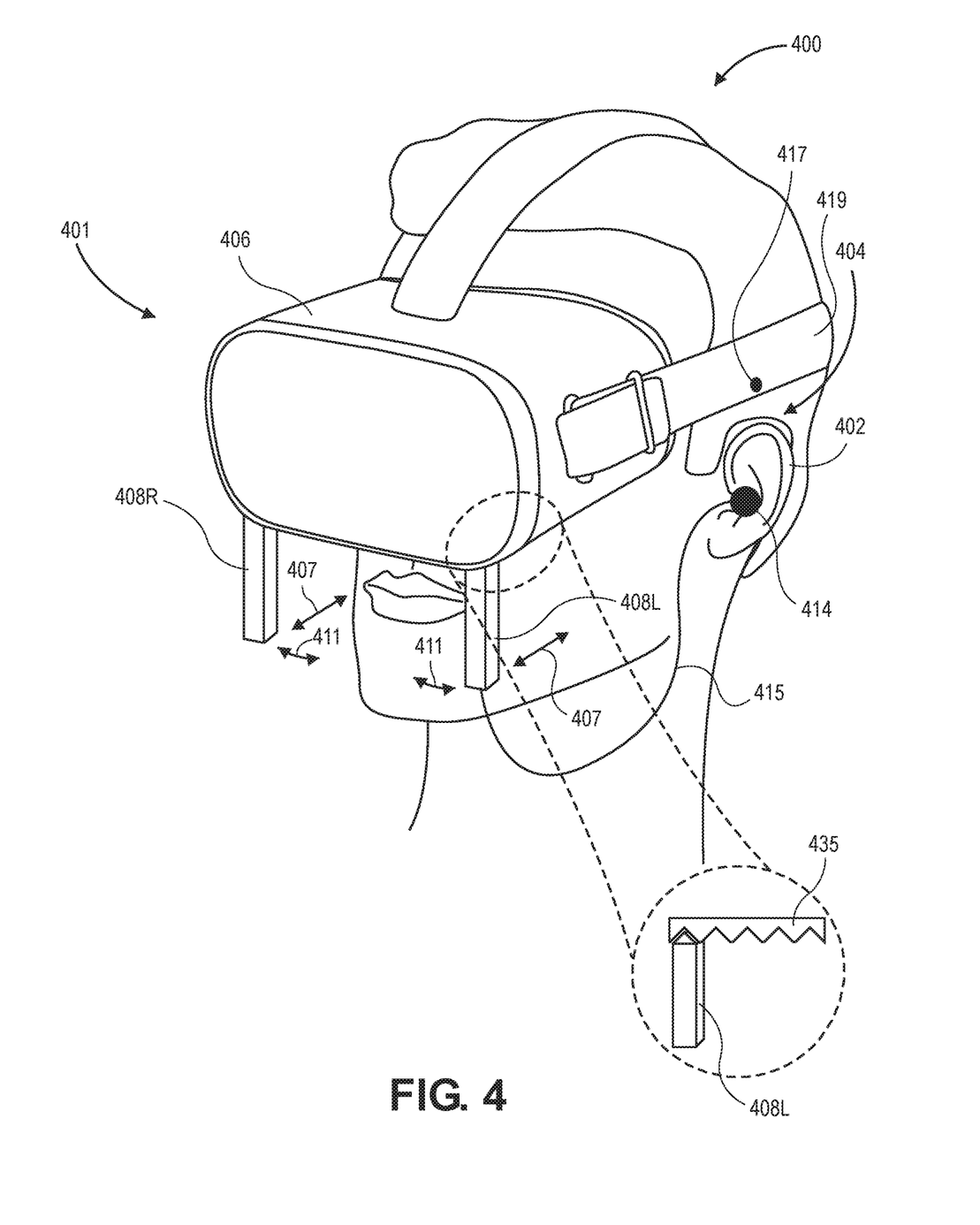
FIG. 4 is a diagram of a head-mounted speaker array apparatus being calibrated, in accordance with implementations of the present disclosure.

FIG. 4 is a diagram of a HMSAA 401, such as the HMSAA discussed above with respect to FIG. 1, being calibrated in accordance with implementations of the present disclosure.

In the illustrated example, microphone 414 of each speaker array 408L/408R of the HMSAA 401 is detachable such that it can be placed at or near the pinna 402 of each ear 404 of the listener 400, as illustrated. When detached, the microphone may communicate with the HMSAA through a wired connection, such as wire 415, or wireless connection, such as Bluetooth, Wi-Fi, Near Field Communication ("NFC"), etc. In other implementations, a separate microphone(s) that communicates with the HMSAA may be positioned at or near the pinna of each ear of the listener and used with the disclosed implementations to determine the approximate distance(s) between the speaker arrays and the pinna of each ear of the listener. For example, the HMSAA may include an audio input jack such that a separate microphone(s) may be coupled through a wired connection to the HMSAA and the microphone positioned at or near the pinna of each ear of the listener. In still other examples, rather than detaching the microphone(s) 414 from the speaker arrays or coupling a separate microphone, a calibration microphone 417 may be included at a position on the frame that is at or near the pinna of the ear of the listener when the HMSAA is worn by the listener. In the illustrated example, the calibration microphone 417 may be included on a strap 419 of the HMSAA such that the calibration microphone 417 is just above the pinna 402 of the ear 404 of the listener. Such a calibration microphone may be on one or both sides of the HMSAA. As another example, and referring briefly to FIG. 5A, calibration microphones 517L/517R may be included in the frame temples 507L/507R of the HMSAA 501 such that the calibration microphones are positioned just above the pinna of each ear of the listener when the HMSAA 501 is worn by the listener.

As discussed above, by positioning of the microphone(s) at or near the pinna of each ear of the listener, sound output by the speaker arrays 408L may be received by the microphone(s) 414 and used to compute a distance between the speaker arrays and the pinna of each ear of the listener. For example, a sound output by the speaker array 408L may be received by the microphone 414 while the microphone is positioned at or near the pinna 402 of the ear 404 of the listener. Based on the time difference between the output of the sound by the speaker array 408L and receipt of the sound by the microphone 414, the distance between the speaker array and the pinna 402 of the ear 404 of the listener 400 may be determined. Likewise, a second sound output by the speaker array 408R may be received by the microphone 414 and based on the time difference between the output of the sound by the speaker array 408R and receipt of the sound by the microphone, the distance between the speaker array 408R and the pinna 402 of the ear 404 of the listener may also be determined. Still further, based on the difference in the sound as output by the speaker array 408R and receipt of the sound by the microphone 414, the amount of shadowing that results from reflections/blocking of the output sound by the face of the user can also be estimated.

In addition, the HMSAA may also include adjustment measurement sensor(s) 435 that are operable to determine an amount of adjustment of each of the speaker arrays 408L/408R. For example, the adjustment measurement sensor 435 may be included in the frame of the HMSAA. In the illustrated example, the adjustment measurement sensor 435 may be included in the coupling between the speaker arrays and the virtually reality glasses 406 and include a series of resistors or other sensors that can determine a position of the respective speaker array as it is adjusted. In other implementations, the adjustment measurement sensor 435 may use other forms of sensors to determine the position of the speaker array 408.

As the listener adjusts one or more of the first speaker array 408L and/or the second speaker array 408R, as illustrated by arrows 407, 411, the adjustment measurement sensor(s) 435 and/or microphone(s) 414/417/517 while positioned at or near the pinna of each ear of the listener, may be used to determine the approximate distances between the speaker arrays and the pinna of each ear of the user.

Figure 5A:
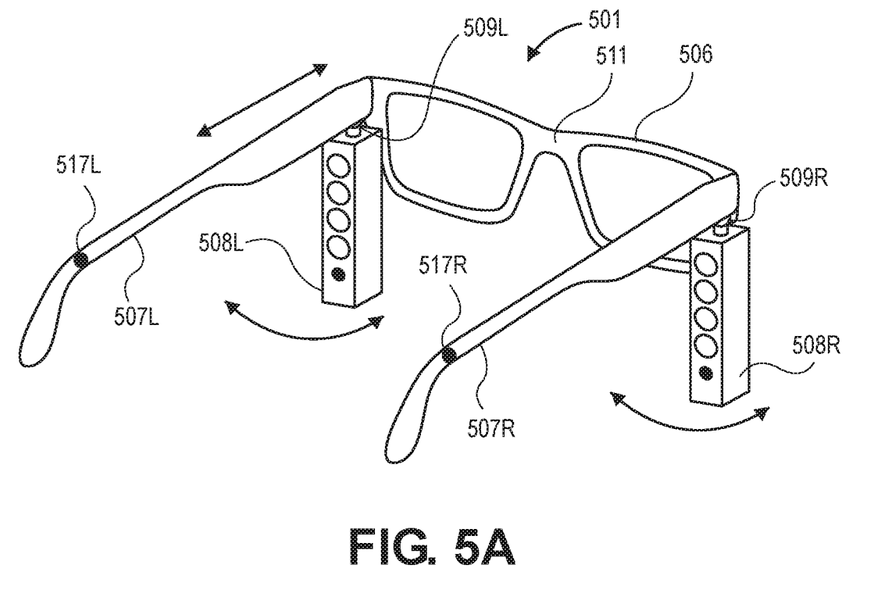
FIGS. 5A through 5B is a schematic diagram of a head-mounted speaker array apparatus coupled to glasses, in accordance with implementations of the present disclosure.
Figure 5B:
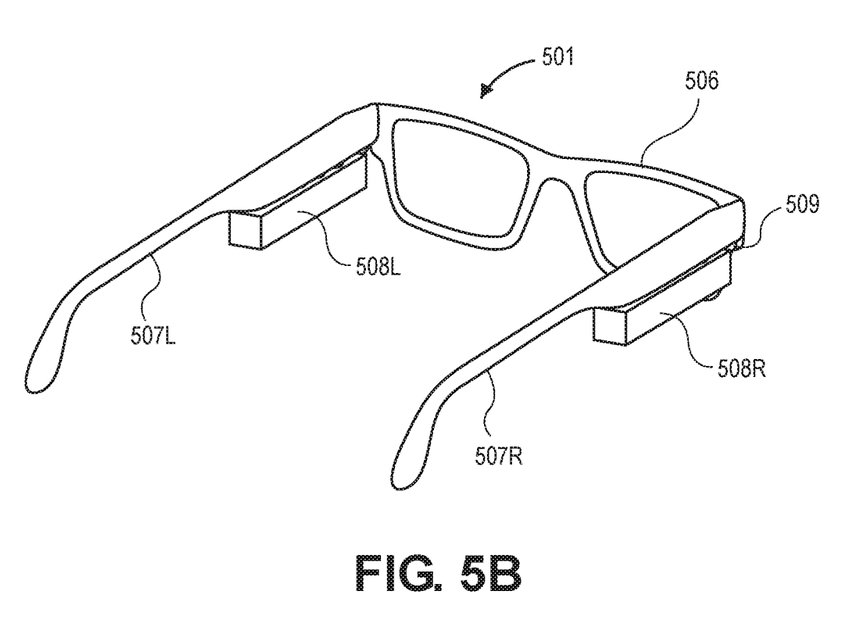

FIGS. 5A and 5B is a schematic diagram of a head-mounted speaker array apparatus 501 that includes frames 506 like glasses, in accordance with implementations of the present disclosure.

In the illustrated example, the frame 506 includes temples 507 and a bridge 511 so that the frame may be worn on the face of a listener and supported by the bridge of the listener's nose and ears. In the illustrated example, the first speaker array 508L may be coupled by a pivot 509L to a first temple 507L of the frame 506. The second speaker array 508R may be coupled by a pivot 509R to a second temple 507R of the frame. In some implementations, the pivots 509L/509R allow the speaker arrays 508L/508R to be rotated between an open position, as illustrated in FIG. 5A, and a closed position, as illustrated in FIG. 5B. In still other implementations, the pivots 509L/509R may allow the speaker arrays 508L/508R to be rotated clockwise and/or counterclockwise around the pivot 509L/509R to adjust an orientation or direction of the speakers of the speaker array with respect to the face/ears of the listener when wearing the HMSAA 501.

Figure 6A:
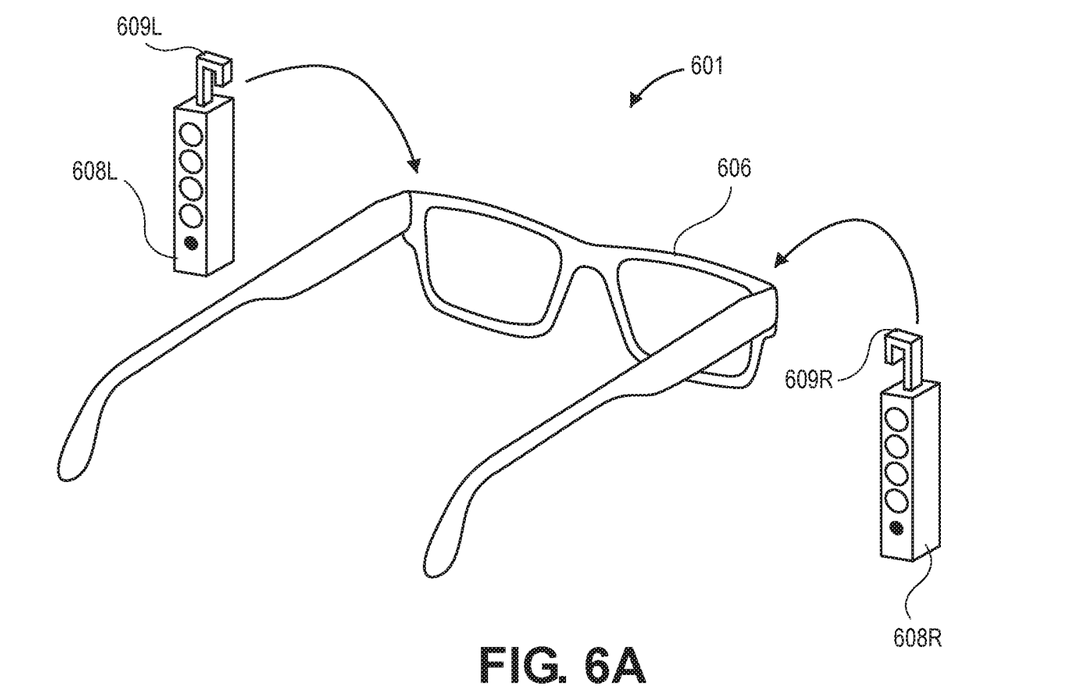
FIGS. 6A through 6B is a schematic diagram of a removable head-mounted speaker array apparatus, in accordance with implementations of the present disclosure.
Figure 6B:
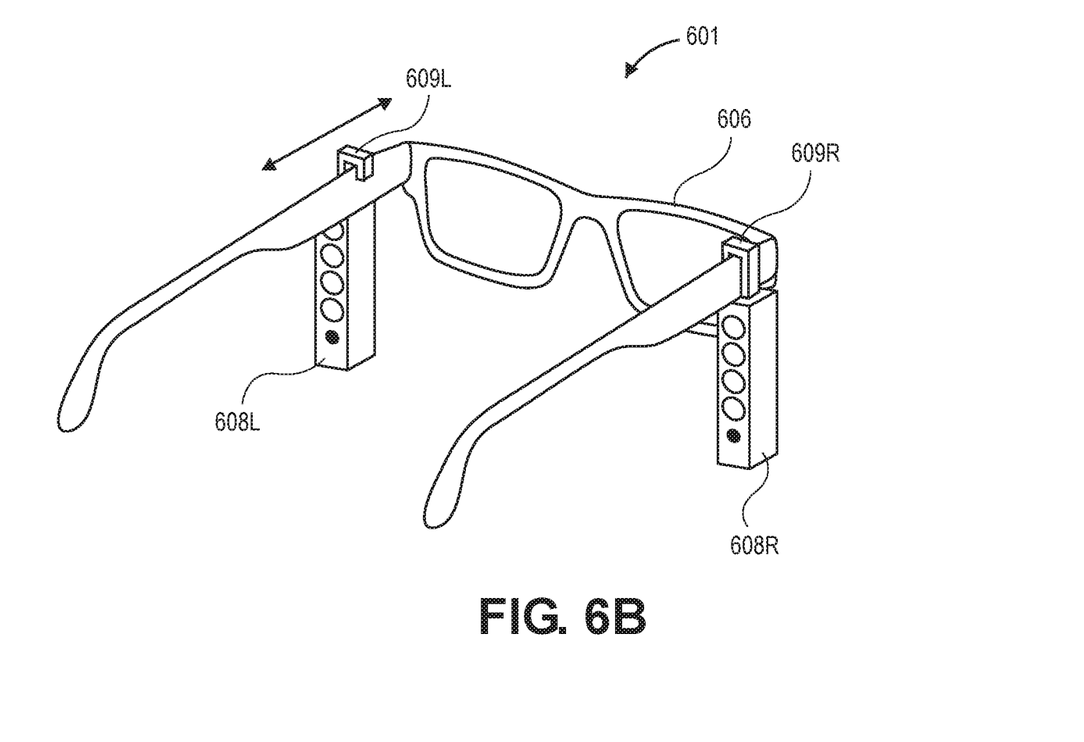

FIGS. 6A and 6B is a schematic diagram of a removable head-mounted speaker array apparatus 601, in accordance with implementations of the present disclosure.

In the illustrated example, the first speaker array 608L may include a first latch 609L that allows the first speaker array to be detachably coupled to a frame 606, such as a pair of glasses. Likewise, the second speaker array 608R may also include a second latch 609R that allows the second speaker array to be detachably coupled to the frame 606. While the example illustrated in FIG. 6B shows the first latch 609L and the second latch 609R as a mechanical latch, or J latch, in other implementations, the first latch 609L and the second latch 609R may be of other forms that allow the first speaker array 608L and second speaker array 608R to be detachably coupled to the frame 606. For example, the latches 609 may include magnets, hook-and-loop fasteners, pins, straps, etc.

Regardless of the form of the latches 609, when the first speaker array 608L and the second speaker array 608R are coupled to the frame 606 and the frame is worn by the listener, the first speaker array 608L and the second speaker array 608R are positioned forward of the pinna of each ear of the listener so that sounds output by the speaker arrays 608L/608R are received by the pinna of each ear of the listener. When the speaker arrays 608L/608R are detached from the frame 606, the speaker arrays 608L/608R may be charged and/or stored for easy transport by the listener.

Figure 7:
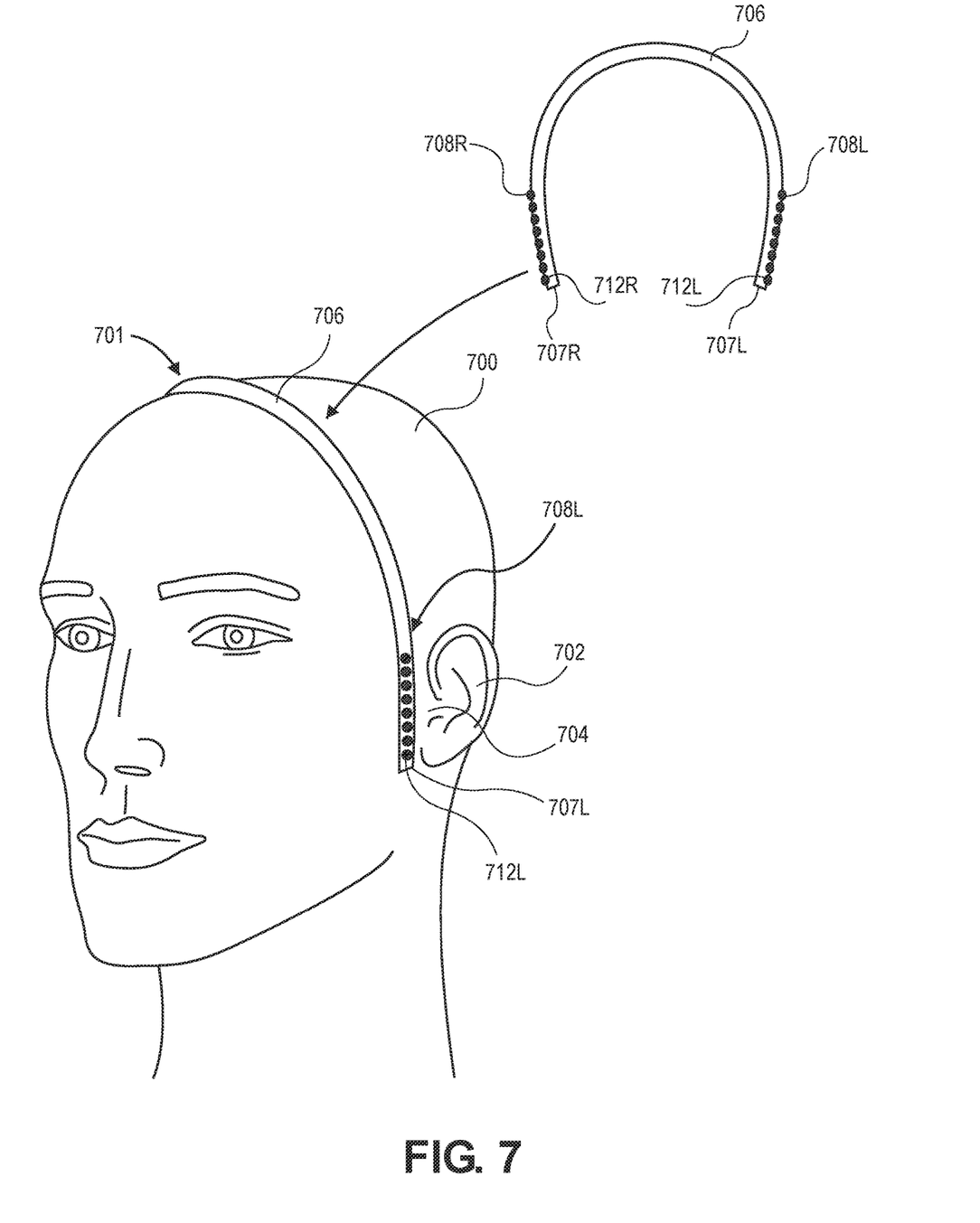
FIG. 7 is a schematic diagram of a head-mounted speaker array apparatus in the form of a headband, in accordance with implementations of the present disclosure.

FIG. 7 is a schematic diagram of a head-mounted speaker array apparatus 701 in the form of a headband 706, in accordance with implementations of the present disclosure.

In the illustrated example, the HMSAA 701 has a curved shape headband 706 with a first end 707L and a second end 707R such that, when the HMSAA 701 is worn on the head of the listener 700, as illustrated in FIG. 7, the first end 707L of the headband 706 is positioned forward of the ear 702 of the listener 700 and the second end 707R of the headband 706 is positioned forward of the second ear of the listener 700. In addition, the first speaker array 708L is coupled to the first end of the headband 706 so that sounds output by the speaker(s) 712L of the first speaker array 708L are received primarily by the pinna 704 of the first ear 702 of the listener 700. Likewise, the second speaker array 712R is coupled to the second end 707R of the headband 706 so that sounds output by speaker(s) 712R of the second speaker array 708R are primarily received by the pinna of the second ear of the listener 700.

In comparison to some of the implementations discussed above, the speaker arrays 708L/708R are positioned forward of the ears of the listener but not forward of the face of the listener. In addition, in some implementations, all or a portion of the speaker arrays 708L/708R may be in contact with a side of the head of the listener, just forward of the ears. In other implementations, the speaker arrays 708L/708R may be separated from the head of the listener 700.

Positioning the speaker arrays 708L/708R forward of the ears but not forward of the face of the listener provides additional separation of sound between the two speaker arrays. Specifically, less sound output by the first speaker array 708L is received by the pinna of the opposing ear of the listener (referred to herein as the second ear) and less of the sound output by the second speaker array 708R is received by the pinna of the first ear 704 of the listener. However, the pinna of both ears are still utilized because the speaker arrays 708L/708R are still positioned forward of the ears of the listener so that sounds output by the speaker are received by the pinna of each ear of the listener.

Likewise, implementations in which some or all of the speaker array 708L/708R contacts the head of the listener may utilize bone conduction, in addition to outputting sounds that are received by the pinna. In such implementations, the bone conduction may be used to provide lower frequency sounds to the listener, which are typically not associated with direction or a point source by the listener.

Figure 8:
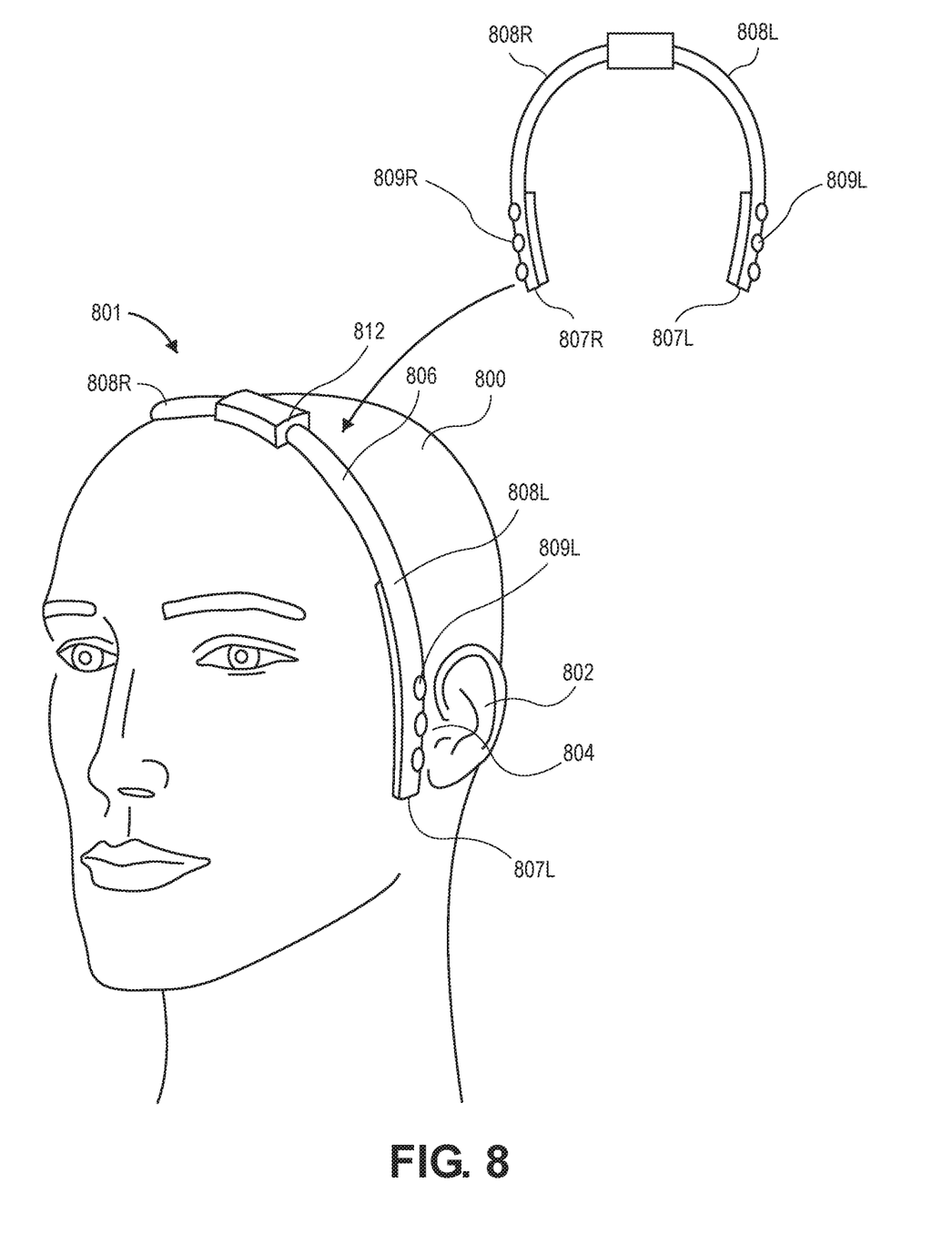
FIG. 8 is a schematic diagram of a head-mounted speaker array apparatus with a waveform channel, in accordance with implementations of the present disclosure.

FIG. 8 is a schematic diagram of a head-mounted speaker array apparatus with a waveform channel, in accordance with implementations of the present disclosure.

In the illustrated example, the HMSAA 801 has a curved shape headband 806 with a first end 807L and a second end 807R such that, when the HMSAA 801 is worn on the head of the listener 800, as illustrated in FIG. 8, the first end 807L of the headband 806 is positioned forward of the ear 802 of the listener 800 and the second end 807R of the headband 806 is positioned forward of the second ear of the listener 800. In the illustrated example, the HMSAA may include a single speaker array 812 that is included on the HMSAA, for example at a mid-point in the headband 806, as illustrated. A first waveguide 808L may extend from the speaker array 812 toward the first end and have one or more opening 809L near the first end so that sound output by the speaker array 812 travels through the first waveguide 808L and are output through the opening 809L and received by the pinna 804 of the ear 802 of the listener. A second waveguide 808R may also extend from the speaker array 812 toward the second end 807R and have one or more openings 809R near the second end 807R so that sound output by the speaker array 812 travels through the second waveguide 808R and are output through the opening 809R and received by the pinna 804 of the ear 802 of the listener.

In comparison to some of the implementations discussed above, the outputs 809L/809R of the waveguides 808L/808R are positioned forward of the ears of the listener but not forward of the face of the listener. In addition, in some implementations, all or a portion of the waveguides 808L/808R may be in contact with a side of the head of the listener, just forward of the ears. In other implementations, the waveguides 808L/808R may be separated from the head of the listener 800 and/or positioned forward of the face of the user.

Positioning the waveguide 808L/808R outputs 809L/809R forward of the ears but not forward of the face of the listener provides additional separation between the outputs of the two waveguides 808L/808R. Specifically, less sound output by the first output 808L is received by the pinna of the opposing ear of the listener (referred to herein as the second ear) and less of the sound output by the second output 808R is received by the pinna of the first ear 804 of the listener. However, the pinna of both ears are still utilized because the outputs 808L/808R are still positioned forward of the ears of the listener.

Likewise, implementations in which some or all of the speaker array 808L/808R contacts the head of the listener may utilize bone conduction, in addition to outputting sounds that are received by the pinna. In such implementations, the bone conduction may be used to provide lower frequency sounds to the listener, which are typically not associated with direction or a point source by the listener. Alternatively, or in addition thereto, bone conduction may be output as part of the speaker array 812.

Figure 9:
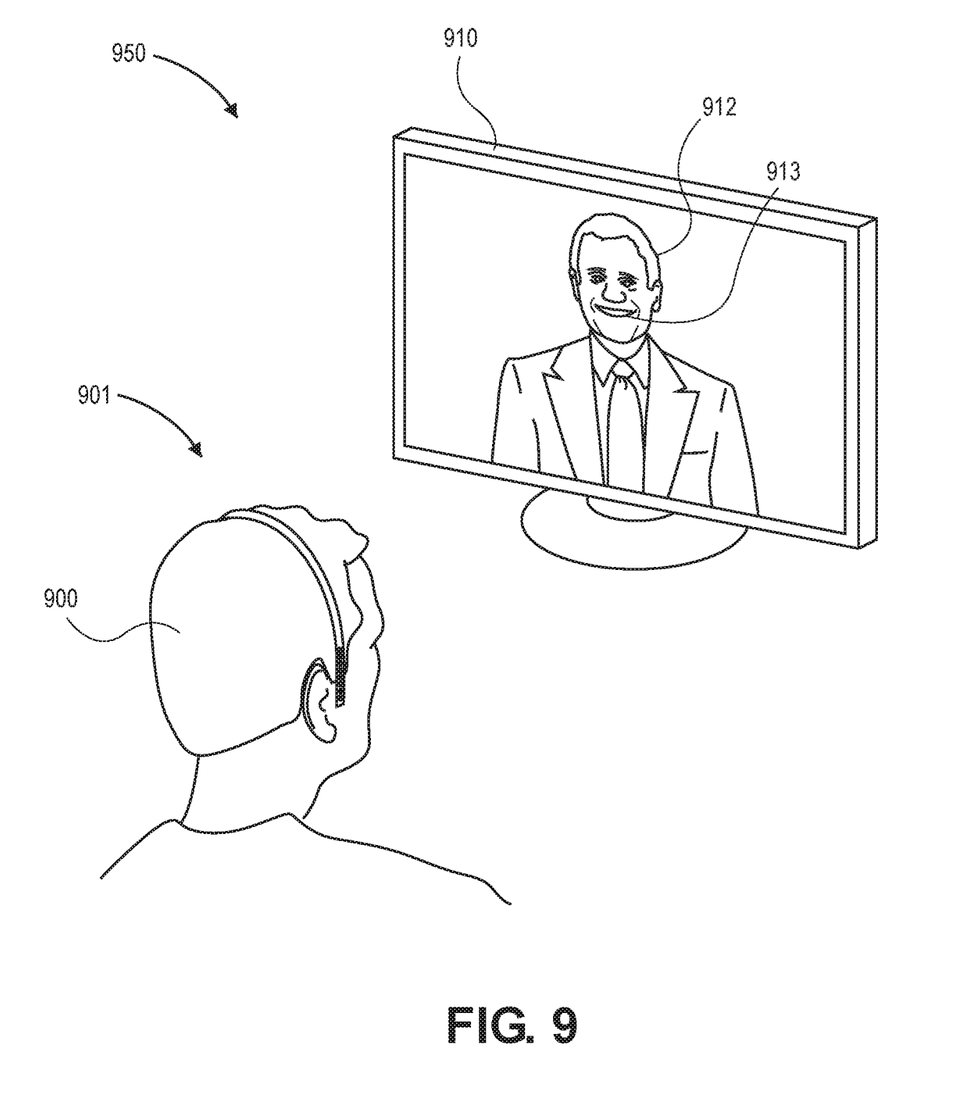
FIG. 9 is a schematic diagram of a listener using a head-mounted display apparatus as part of a video conferencing system, in accordance with implementations of the present disclosure.

FIG. 9 is a schematic diagram of a listener, referred to in the discussion presented with respect to FIG. 9 as a first user 900, using a head-mounted display apparatus 901 as part of a video conferencing system 950, in accordance with implementations of the present disclosure.

As shown in FIG. 9, the portion of the example conference system 950 may include a presentation device 910, such as a television, within a local environment in which a first user is positioned. The presentation device may output video data generated by video capture devices at a remote location, which may include video capture of a second user 912 with whom the first user may engage in a video conference using the video conference system 950.

In some examples, audio transducers (e.g., microphones) within a remote environment in which the second user 912 is talking may receive audio signals from the second user 912 within the remote environment, and the HMSAA 901 in the local environment may be configured to simulate a perceived point source for the audio as associated with the mouth 913 of the second user 912 within the remote environment, as presented via a presentation device 910 within the local environment. For example, video data of the second user 912 within the remote environment may be captured by a wide angle, high resolution imaging device. The image data may be processed to identify a head of the user, and to determine a position of the head and/or mouth of the user when presented on the presentation device 910. Based on the determined position of the mouth of the user, time delays, output level differences, reverberations, etc., may be selected for the first speaker array and second speaker array of the HMSAA 901 so that sounds output by the first speaker array and the second speaker array are perceived by the first user 900 to originate from a point source that corresponds with the mouth 913 of the user 912 presented on the presentation device 910. Such adjustments and perceived source information may be realized with mono-audio received from the remote environment, or any other form of audio.

With the technical improvements realized by the disclosed implementations, rather than the perceived source of the voice of the user originating from inside the head of the listener, as experienced with over the ear or in-ear headphones, or not being able to determine a point source for the voice of the user, as experienced with in-room speakers, the disclosed implementations provide the ability for the listener to perceive the point source of the voice of the user in a forward position of the listener that corresponds to the position of the mouth of the user presented on the display (forward localization).

While the example illustrated with respect to FIG. 9 depicts a first user at a local environment communicating with a single second user at a remote environment, it will be appreciated that the disclosed implementations may be used with any number of participants that may be in communication with each other, e.g., via Ethernet, the Internet, or other networks, controllers, or control systems that may communicate via various wired and/or wireless connections. In this manner, two or more users may communicate and interact with each other using respective portions of an example video conference system.

While the examples illustrated in FIGS. 1, 4, 5A, 5B, 6A, 6B, 7, 8, and 9 illustrate various forms and configurations of frames that may be used with the disclosed implementations to position the first speaker array and the second speaker array of an HMSAA forward of the first pinna of the first ear and the second pinna of the second ear when worn by a listener, it will be appreciated that various other forms and configurations are equally applicable to the disclosed implementations. For example, and without limitation, other implementations may include or be coupled to a hat, visor, helmet, headband, or any other type of object that may be placed on or worn by a listener such that, when worn by the user, the first speaker array is positioned forward of the first pinna of the first ear of the listener and the second speaker array is positioned forward of the second pinna of the second ear of the listener.

Figure 10:
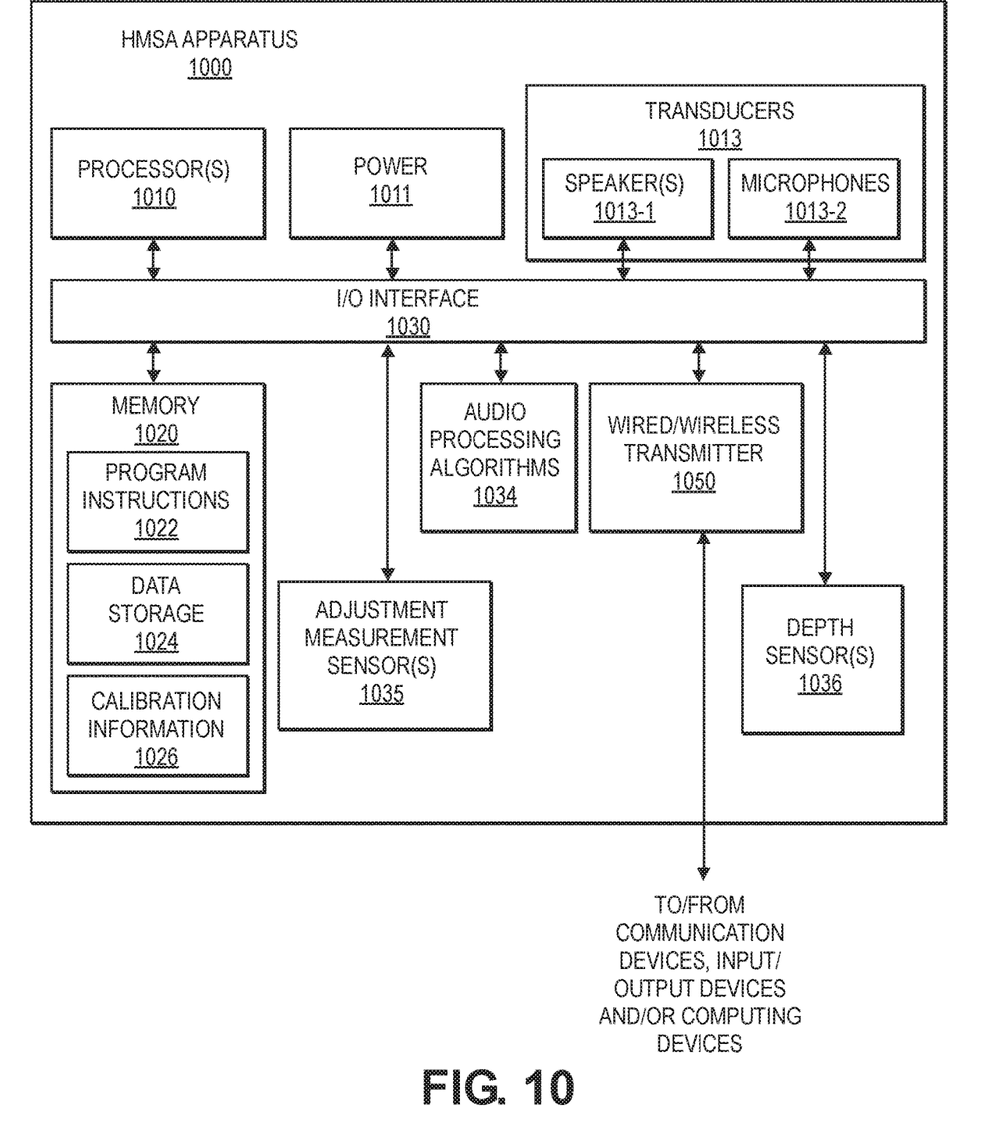
FIG. 10 is a block diagram illustrating components of an example head-mounted speaker array apparatus, in accordance with implementations of the present disclosure.

FIG. 10 is a block diagram illustrating components of an example head-mounted speaker array apparatus 1000, in accordance with implementations of the present disclosure.

In the illustrated implementation, the HMSAA 1000 includes one or more processors 1010, coupled to a non-transitory computer-readable storage medium or memory 1020 via an input/output (I/O) interface 1030. The HMSAA 1000 further includes a wired/wireless transmitter 1050 that enables wired/wireless communication between the HMSAA 1000 and other devices, networks, etc., such as an audio source. The wired/wireless transmitter 1050 may utilize any form of wired and/or wireless communication including, but not limited to USB audio, compressed audio, Bluetooth, Near Field Communication, Wi-Fi, cellular, etc.

In various implementations, the HMSAA 1000 may be a uniprocessor system including one processor 1010, or a multiprocessor system including several processors (e.g., two, four, eight, or another suitable number). The processor(s) 1010 may be any suitable processor capable of executing instructions. For example, in various implementations, the processor(s) 1010 may be general-purpose or embedded processors implementing any of a variety of instruction set architectures (ISAs), such as the x86, PowerPC, SPARC, or MIPS ISAs, or any other suitable ISA. In multiprocessor systems, each of the processors 1010 may commonly, but not necessarily, implement the same ISA.

The non-transitory computer-readable storage medium 1020 may be configured to store executable instructions and/or data accessible by the one or more processors 1010. In various implementations, the non-transitory computer-readable storage medium 1020 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1020 as program instructions 1022, data storage 1024, and calibration information 1026. In other implementations, program instructions and/or data may be received, sent or stored upon different types of computer-accessible media, such as non-transitory media, or on similar media separate from the non-transitory computer-readable storage medium 1020 or the HMSAA 1000. Generally speaking, a non-transitory, computer-readable storage medium may include storage media or memory media such as magnetic or optical media, e.g., disk or CD/DVD-ROM, coupled to the HMSAA 1000 via the wired/wireless transmitter 1050. Program instructions and data stored via a non-transitory computer-readable medium may be transmitted by transmission media or signals such as electrical, electromagnetic, or digital signals, which may be conveyed via a communication medium such as a wireless link, such as may be implemented via the wired/wireless transmitter 1050.

As discussed above, the HMSAA 1000 also includes one or more speakers 1013-1, often in the form of speaker arrays, and may optionally include one or more microphones 1013-

2, which are collectively identified in FIG. 10 as transducers 1013. As discussed above, the speakers of one or more speaker arrays of the HMSAA may be used to output sounds that are perceived by a listener wearing the HMSAA as having a perceived point source originating from any direction with respect to the listener. The microphones 1013-2 may be used to receive audio generated by the listener/user wearing the HMSAA 1000 and/or to receive audio data output by the speakers 1013-1, for calibration purposes for example. In some implementations, the HMSAA 1000 may also include a mechanical measurement sensor(s) 1035 and/or depth sensors 1036. As discussed above, the mechanical measurement sensors 1035 may be used to determine adjustment of the speaker arrays closer together/ farther apart and/or closer/farther from a face of the listener or the pinna of each ear of the listener. Alternatively, or in addition thereto, the depth sensors 1036 may be used to determine the approximate distance between speaker arrays and/or the approximate distances between the speaker arrays and the pinna of each ear of the listener.

Likewise, the HMSAA 1000 may also include one or more power sources 1011, such as batteries. In some implementations, the batteries may be rechargeable and incorporated into the HMSAA apparatus 1000 and operable to provide power to the transducers 1013, audio processing algorithms 1034, and/or the wired/wireless transmitter 1050 of the HMSAA 1000. In other implementations, the HMSAA may be passive and receive power through a wired and/or wireless connection, such as through the wired/wireless transmitter 1050.

The audio processing algorithms 1034 may be operable to receive and process audio data received via the wired/wireless transmitter and output that audio data through the speakers 1013-1 of one or more speaker arrays, as discussed above.

The I/O interface 1030 may be configured to coordinate I/O traffic between the processor(s) 1010, the non-transitory computer-readable storage medium 1020, and any peripheral devices, including the wired/wireless transmitter 1050 or other peripheral interfaces. In some implementations, the I/O interface 1030 may perform any necessary protocol, timing or other data transformations to convert data signals from one component (e.g., non-transitory computer-readable storage medium 1020) into a format suitable for use by another component (e.g., processors 1010). In some implementations, the I/O interface 1030 may include support for devices attached through various types of peripheral buses, such as a variant of the Peripheral Component Interconnect (PCI) bus standard or the Universal Serial Bus (USB) standard, for example. In some implementations, the function of the I/O interface 1030 may be split into two or more separate components, such as a north bridge and a south bridge, for example. Also, in some implementations, some or all of the functionality of the I/O interface 1030, such as an interface to the non-transitory computer-readable storage medium 1020, may be incorporated directly into the processor(s).

The wired/wireless transmitter 1050 may be configured to allow data to be exchanged between the HMSAA 1000 and other devices attached to a network and/or the HMSAA, such as control systems, video conferencing systems, audio outputs, other computer systems, presentation devices, etc.

As shown in FIG. 10, the memory 1020 may include program instructions 1022 that may be configured to implement one or more of the described implementations and/or provide data storage 1024 and calibration information 1026.

Those skilled in the art will appreciate that the HMSAA 1000 is merely illustrative and is not intended to limit the scope of implementations. In particular, the HMSAA may include any combination of hardware or software that can perform the indicated functions. The HMSAA 1000 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementations described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIG. 3, orders in which such methods, processes, or steps are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may,"unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately,""generally," "nearly" or "substantially," as used herein, represent a value, amount, or characteristic close to the stated value, amount, or characteristic that still performs a desired function or achieves a desired result. For example, the terms "about," "approximately,""generally," "nearly" or "substantially" may refer to an amount that is within less than 10% of, within less than 5% of, within less than 1% of, within less than 0.1% of, and within less than 0.01% of the stated amount.

What is claimed is:

1. An apparatus, comprising:
a frame to be worn on a head of a listener;
a first speaker array, coupled to the frame, and positioned to be forward of a face of the listener and forward of a first pinna of a first ear of the listener when the frame is worn by the listener, wherein the first speaker array includes a first adjustment mechanism that couples the first speaker array to the frame such that the first speaker array may be moved closer or farther from the face of the listener when the apparatus is worn by the listener; and
a second speaker array, coupled to the frame, and positioned to be forward of the face of the listener and forward of a second pinna of a second ear of the listener when the frame is worn by the listener.

2. The apparatus of claim 1, wherein:
the first speaker array is positioned to be a first distance from the first pinna of the first ear of the listener and a second distance from the second pinna of the second ear of the listener, wherein the second distance is at least twice the first distance.

3. The apparatus of claim 2, wherein the first distance is less than approximately six inches in front of the face of the listener.

4. The apparatus of claim 1, wherein:
the first speaker array includes a first plurality of speakers; and
the second speaker array includes a second plurality of speakers.

5. The apparatus of claim 1, further comprising:
a microphone included in the first speaker array.

6. An apparatus, comprising:
a first speaker array including a first plurality of speakers, coupled to a frame, and positioned to be forward of a face of a listener and forward of a first pinna of a first ear of the listener when the frame is worn by the listener such that audio output by the first plurality of speakers of the first speaker array is primarily received and reflected by the first pinna of the first ear of the listener, wherein the first speaker array includes a first adjustment mechanism that couples the first speaker array to the frame such that the first speaker array may be moved closer or farther from a face of the listener when the apparatus is worn by the listener; and
a second speaker array including a second plurality of speakers, coupled to the frame, and positioned to be forward of the face of the listener and forward of a second pinna of a second ear of the listener when the frame is worn by the listener such that the audio output by the second plurality of speakers of the second speaker array is primarily received by the second pinna of the second ear of the listener.

7. The apparatus of claim 6, further comprising:
a virtual reality projection system coupled to the frame to present visual information to the listener, wherein the visual information is correlated to a perceived point source of a sound output by the first speaker array and the second speaker array such that the sound is perceived by the listener to originate from an object represented in the visual information.

8. The apparatus of claim 6, further comprising:
a first microphone included in the first speaker array; and
a second microphone included in the second speaker array.

9. The apparatus of claim 6, further comprising:
a first latch included on the first speaker array that detachably couples the first speaker array to the frame; and
a second latch included on the second speaker array that detachably couples the second speaker array to the frame.

10. The apparatus of claim 6, further comprising:
a second adjustment mechanism that couples the second speaker array to the frame such that the second speaker array may be moved closer or farther from the face of the listener when the apparatus is worn by the listener.

11. The apparatus of claim 6, further comprising:
an adjustment measurement sensor operable to determine an amount of an adjustment of the first speaker array by the first adjustment mechanism.

12. The apparatus of claim 6, wherein:
the first speaker array is positioned to be a first distance from the first pinna of the first ear of the listener and a second distance from the second pinna of the second ear of the listener, wherein the second distance is greater than the first distance.

13. An apparatus, comprising:
a frame configured to be worn on a head of a listener;
a first speaker coupled to the frame and operable to produce a first sound, wherein at least a first portion of the first sound is received and reflected by a first pinna of a first ear of the listener and a second portion of the first sound is received and reflected by a second pinna of a second ear of the listener; and
a first adjustment mechanism that couples the first speaker to the frame such that the first speaker is positioned forward of the face of the listener and may be moved closer or farther from the first pinna of the listener when the apparatus is worn by the listener.

14. The apparatus of claim 13, further comprising:
a battery included in the frame;
a second speaker coupled to the frame, powered by the battery, and positioned forward of the second pinna of the second ear of the listener when the frame is worn by the listener and oriented to produce a second sound, wherein a first portion of the second sound is received by the first pinna of the first ear of the listener and a second portion of the second sound is received by the second pinna of the second ear of the listener; and wherein the first speaker is coupled to the frame, powered by the battery, and positioned forward of the first pinna of the first ear of the listener when the frame is worn by the listener.

15. The apparatus of claim 13, further comprising:
a first waveguide included in the frame and having a first output;
a second waveguide included in the frame and having a second output; and
wherein:
   when the frame is worn by the listener, the first output is positioned forward of the first pinna of the first ear of the listener and the second output is positioned forward of the second pinna of the second ear of the listener;
   the first waveguide channels the first sound toward and out of the first output; and
   the second waveguide channels the first sound toward and out of the second output.

16. The apparatus of claim 13, further comprising:
a transmitter included in the frame and operable to receive, from a source external to the apparatus, audio data that is output by the first speaker.

17. The apparatus of claim 13, further comprising:
a virtual reality projection system coupled to the frame to present visual information to the listener, wherein the visual information is correlated to a point source of the first sound output by the first speaker such that the first sound is perceived by the listener to originate from an object included in the visual information.

18. The apparatus of claim 13, wherein:
the first speaker is positioned forward of the first pinna of the first ear of the listener, at a first distance from the first pinna of the first ear of the listener, and a second distance from the second pinna of the second ear of the listener, wherein the second distance is greater than the first distance.

* * * * *